US012669311B2

(12) United States Patent
Schlögl

(10) Patent No.: US 12,669,311 B2
(45) Date of Patent: Jun. 30, 2026

(54) BALLISTIC BLOCK FOR A BULLET RESISTANT GLAZING

(71) Applicant: sedak GmbH & Co. KG, Gersthofen (DE)

(72) Inventor: Fritz Schlögl, Stadtbergen (DE)

(73) Assignee: sedak GmbH & Co. KG, Gersthofen (DE)

( * ) Notice: Subject to any disclaimer, the term of this patent is extended or adjusted under 35 U.S.C. 154(b) by 0 days.

(21) Appl. No.: 18/628,997

(22) Filed: Apr. 8, 2024

(65) Prior Publication Data

US 2024/0353205 A1 Oct. 24, 2024

Related U.S. Application Data

(63) Continuation of application No. 17/679,921, filed on Feb. 24, 2022, now Pat. No. 11,976,902.

(30) Foreign Application Priority Data

Mar. 3, 2021 (EP) .................................... 21160397

(51) Int. Cl.

| | |
|---|---|
| ***F41H 5/04*** | (2006.01) |
| *E06B 3/67* | (2006.01) |
| *E06B 5/10* | (2006.01) |

(52) U.S. Cl.

CPC .......... *F41H 5/0407* (2013.01); *E06B 3/6715* (2013.01); *E06B 5/10* (2013.01)

(58) Field of Classification Search

CPC ......... F41H 5/0407; E06B 3/6715; E06B 5/10
USPC ........................................................ 89/36.02
See application file for complete search history.

(56) References Cited

U.S. PATENT DOCUMENTS

| | | | | |
|---|---|---|---|---|
| 9,157,703 | B2 * | 10/2015 | Thompson | B32B 27/365 |
| 2011/0308381 | A1 * | 12/2011 | Hartley | F41H 5/0407 89/917 |
| 2013/0302581 | A1 * | 11/2013 | Mannheim Astete | C03B 23/0258 156/196 |
| 2014/0260932 | A1 * | 9/2014 | Hydras | F41H 5/0428 89/36.02 |
| 2020/0331237 | A1 | 10/2020 | Knuth | |

(Continued)

FOREIGN PATENT DOCUMENTS

| | | | |
|---|---|---|---|
| DE | 20202223 | U1 | 10/2002 |
| EP | 3593994 | A2 | 1/2020 |

(Continued)

OTHER PUBLICATIONS

"What is Tempered Glass?" by FGD Glass solutions; https://www.fgdglass.com/blog/what-is-tempered-glass/ (Year: 2023).*

*Primary Examiner* — Samir Abdosh
(74) *Attorney, Agent, or Firm* — Greenberg Traurig, LLP

(57) ABSTRACT

The invention relates to a ballistic block (10) particularly for a bullet-resistant glazing (100) or as bullet-resistant glazing (100), wherein the ballistic block (10) comprises at least two transparent panes (11, 12, 13, 14) joined to one another via an interlayer (19), whereby the ballistic block (10) is constructed without an energy-absorbing layer or polycarbonate film, and whereby the at least two transparent panes (11, 12, 13, 14) and in particular all the transparent panes (11, 12, 13, 14) of the ballistic block (10) are each panes made of toughened glass.

6 Claims, 3 Drawing Sheets

(56) References Cited

U.S. PATENT DOCUMENTS

Figure 1:
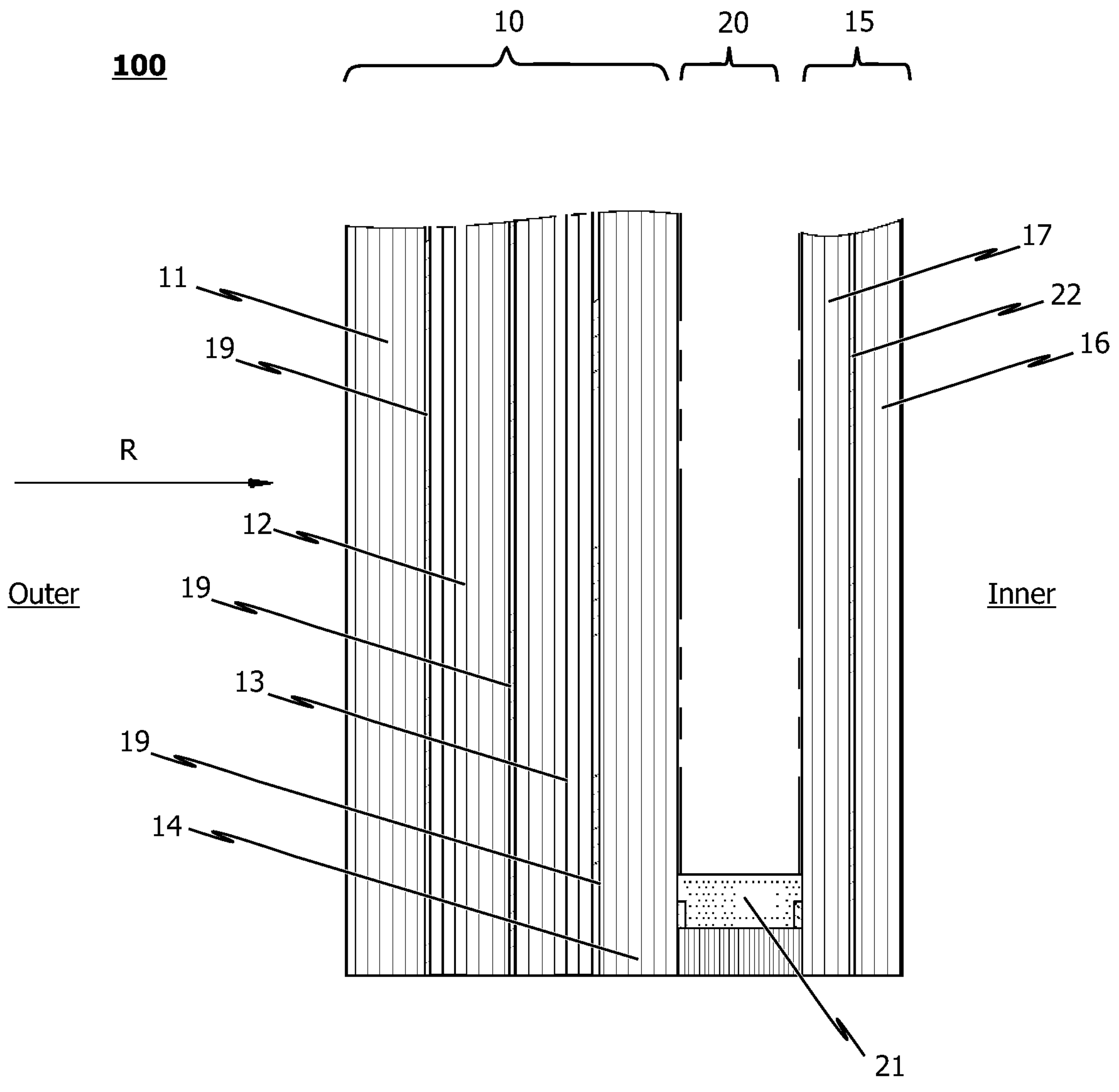

| | | | | |
|---|---|---|---|---|
| 2021/0238911 | A1* | 8/2021 | Theriault | E06B 3/2605 |

FOREIGN PATENT DOCUMENTS

| | | | |
|---|---|---|---|
| EP | 3640409 | A1 | 4/2020 |
| WO | 2020078969 | A1 | 4/2020 |

* cited by examiner

BALLISTIC BLOCK FOR A BULLET RESISTANT GLAZING

CROSS-REFERENCE TO RELATED APPLICATIONS

The present application is a continuation of U.S. patent application Ser. No. 17/679,921, filed Feb. 24, 2022, which claims the benefit of and priority under 35 U.S.C. § 119 to European Patent Application No. 21160397.2, filed on Mar. 3, 2021, the entire contents and disclosure of each of which are hereby incorporated by reference herein.

DESCRIPTION

The invention relates to bullet-resistant glazing. In particular, the invention relates to a ballistic block for bullet-resistant glazing or as bullet-resistant glazing, particularly in the form of a transparent, shatterproof and bullet-resistant glazing, as well as its use.

Designing wall structures, for example building façades, to be bullet-resistant is known in the case of properties deemed high-security. Such façade or wall structures which need to be of transparent design call for the arrangement of bullet-resistant glass elements. In view of the high demands placed on thermal insulation, bullet-resistant insulating glass elements are generally used.

Such a bullet-resistant insulating glass element is known from printed publication DE 2 901 951 A1, for example. The insulating glass pane is thereby formed from two individual panes spaced apart from each other by a spacer. The resultant air gap ensures the desired improved thermal insulation.

The bullet-proof glass pane is formed from further individual panes bonded together and arranged on the individual panes. This creates so-called laminated glass packages composed of multiple consecutively arranged individual panes joined to one another on their mutually contacting surfaces by films or cast resin.

For manufacturing reasons, however, the dimensions of bullet-resistant insulating glass elements are limited. Façades or wall structures therefore require a plurality of individual bullet-resistant insulating glass elements, these needing to be arranged distanced from one another so as to be able to arrange the elements ultimately forming the frame in order to then enable a retentive mounting of each individual insulating glass element edge.

However, this approach has several disadvantages. If, for example, oblique fire hits the area around an edge of the bullet-resistant insulating glass element at which the line of fire into the bullet-resistant insulating glass element runs obliquely; i.e. to its main plane, the projectiles can force into the edge region of the insulating glass elements. After that, the projectiles only have to penetrate the designated elements of the façade structure in order to reach the area to be protected.

The elements of the façade that hold the bullet-resistant insulating glass elements are generally composite profile arrangements, particularly in the form of hollow aluminum chamber profiles not having sufficient bullet-resistant effect. Since the projectiles only need to penetrate part of the individual panes of the laminated glass package when fired obliquely, this poses a danger to the area to be protected. The ballistic resistance of bullet-resistant insulating glass elements to oblique fire can in individual cases be extremely strong.

In order to avoid this disadvantage, providing steel inserts on the elements of the façade in the area between adjacent insulating glass elements is known. Some cases require multiple such steel inserts which can be arranged for example in the hollow spaces of respective hollow chamber profiles.

The arranging of such steel inserts is however extremely labor-intensive since a series of additional work steps are required when manufacturing the corresponding façade structures. For instance, the steel inserts need to be deflected in accordance with the length of the elements of the façade structure to be protected and inserted, secured and affixed in places that are generally difficult to access. Sometimes, additional steel corner pieces need to be factored into the area of corner connections for also protecting the corner regions of the façade structure against ballistic fire.

A further problem with such steel inserts is disrupting the poor heat transfer sought in the corresponding areas of the façade. It may therefore be necessary to arrange additional insulating inserts, which in turn entails additional costs in manufacturing and particularly assembly.

Instead of using steel inserts, it would be conceivable—at least theoretically—to increase the dimensions of the bullet-resistant insulating glass elements. However, as already indicated, the dimensions are limited, particularly for manufacturing reasons. Particularly due to technical reasons, only bullet-proof or respectively bullet-resistant glazing of relatively small dimensions are currently feasible since the polycarbonate panels or shatterproof films usually applied limit the dimensions able to be realized. Larger formats cannot be realized particularly because it would then no longer be possible to fulfill the structural requirements. This is due in particular to the fact that laminate films for polycarbonate can no longer provide load transfer once they get to a size of even just around 10 $m^2$.

Moreover, although the percentage of polycarbonate in the bullet-proof/bullet-resistant glazing would have a positive effect on ballistic resistance, there are, however, negative consequences with respect to reaction to fire once the plastic content or respectively polycarbonate content reaches a certain degree.

Bullet-proof non-splinterting glass in the BR1-NS to BR7-NS classes pursuant to EN 1063 is currently based primarily on an inner layer of either polycarbonate or a tear-resistant clear film. These inner layers have the disadvantage of not being as scratch-resistant as glass and limited in manufacturing size. Glass performance is also limited by the use of laminating films as specifically required for bonding polycarbonate to glass. Nor are any solar control layers possible in terms of insulating glass production.

The intent of the present invention is to eliminate these disadvantages.

The "essence" of the invention is in particular to be regarded as that of using a ballistic block particularly of monolithic construction; i.e. without further glazing in front of or behind the ballistic block, as bullet-resistant glazing, wherein the ballistic block is constructed from a plurality of sandwiched panes of toughened glass (heat-strengthened or fully tempered glass) joined together by a high-strength ionoplast layer. This construction-due on the one hand to the toughened glass and on the other to the high-strength ionoplast bond-creates a structurally self-supporting glazing. This glazing can thus be used without a frame, for example as a partition between people. To that end, it is advantageous for the ballistic block to in particular have a symmetrical structure so that both lateral faces of the ballistic block function as the "attack side" in terms of bullet-resistant glazing certification.

The ballistic block comprises in particular more than five, and particularly more than six heat-strengthened panes, each of a thickness of at least 5 mm and at least 10 mm, which are joined together using ionoplast films 0.4 mm to 0.9 mm thick to form a laminated glass block.

Alternatively to a monolithic ballistic construction, it is however also conceivable for the ballistic block to potentially have at least one further pane connected to the ballistic block via a spacer, thereby forming a space between the panes. This configuration enables an overall thinner ballistic block—for example with only three heat-strengthened panes, each of a thickness of at least 5 mm and at least 10 mm. Any potential splinters from the exterior transparent panes of the ballistic block consisting of toughened glass are thereby caught in the space between the panes; i.e. in the hollow space between the ballistic block and the at least one further pane.

On the basis of this problem as set forth, the invention is thus based on specifying a bullet-resistant glazing which enables also realizing significantly larger dimensions than the dimensions currently able to realized, whereby splintering is at the same time to be effectively prevented when the glazing is under fire, and whereby the bullet-resistant glazing furthermore meets the conditions specified in the EN 1063 standard for classes BR1-NS to BR7-NS (standard version: filing date).

According to the invention, this task is solved by the subject matter of independent claim 1, whereby advantageous developments of the ballistic block specified in independent claim 1 are indicated in the subclaims.

Accordingly, the present invention relates in particular to a ballistic block particularly for a bullet-resistant glazing or as a bullet-resistant glazing, wherein the ballistic block comprises at least two transparent panes joined to one another via an interlayer, whereby the ballistic block is constructed without an energy-absorbing layer or polycarbonate film, and whereby the at least two transparent panes and in particular all the transparent panes of the ballistic block are each panes made of toughened glass.

According to embodiments of the ballistic block, the panes of the ballistic block are fully tempered glass panes or panes of heat-strengthened glass.

According to embodiments of the ballistic block, the interlayer between the at least two transparent panes of the ballistic block is formed is at least partly or partially from an ionoplast polymer. The interlayer between the at least two transparent panes of the ballistic block is in particular an SGP film, preferably having an overall maximum nominal thickness of 0.9 mm.

According to embodiments of the ballistic block, the at least two transparent panes are combined into one structurally self-supporting unit via the interlayer such that when installed, the ballistic block only needs to be retained on one side or at most only on two sides.

According to embodiments of the ballistic block, the ballistic block exhibits a symmetrical and in particular a symmetrical and monolithic construction. This means that there is no need to designate an attack side for certification. The ballistic block is particularly suitable as a free-standing partition between people, for example at airports. What is important here is that the ballistic block has bullet-resistant properties on both sides.

Using glass panes of toughened glass, in particular heat-strengthened panes, in combination with high-strength ionoplast films as interlayers achieves the self-supporting property of the bullet-resistant glazing. The glazing therefore does not require a supporting frame, etc. This is unique to this point in time since conventional bullet-resistant glazing is nothing other than framed ballistic panels, whereby the supporting frame likewise needs to have an appropriate bullet-proof design.

According to a further aspect, the present invention relates in particular to a bullet-resistant glazing having a ballistic block of at least two transparent panes joined together by an interlayer. In addition to the ballistic block, the bullet-resistant glazing has at least one further transparent pane arranged parallel to and at a spacing from the panes of the ballistic block and is connected to the ballistic block via a peripheral spacer such that a hollow space is formed between the ballistic block and the at least one further pane.

The invention thereby particularly provides for the bullet-resistant glazing and in particular the ballistic block of the bullet-resistant glazing to be realized without an energy-absorbing layer or polycarbonate film.

According to the invention, the ballistic block is in particular of a structurally self-supporting design. This structurally self-supporting property of the ballistic block is achieved by the interlayer between the transparent panes of the ballistic block being formed from a material of high strength compared to polycarbonate. In particular, however, the structurally self-supporting property of the ballistic block is achieved by the transparent panes of the ballistic block not consisting of float glass as in the prior art but rather toughened glass. This results in being able to achieve the static self-supporting property of the ballistic block.

In the construction trade, the term "structurally self-supporting" is understood as a structure which itself assumes the supporting function. No distinction is made between solely bending/torsion or shear-stressed components and parts. Rather, all parts act statically as shells and accommodate in their entirety the forces introduced. Neither are any frame structures or the like needed to hold the ballistic block, or the glass panes of the ballistic block respectively, since the ballistic block itself is structurally self-supporting.

The rigidity needed to implement particularly the ballistic block as structurally self-supporting can only be achieved by using toughened glass for the glass panes of the ballistic block. It has been shown in this context that a ballistic block constructed from float glass does not have any self-supporting properties in the static sense.

The at least one further transparent pane of the bullet-resistant glazing and in particular all the further transparent panes of the bullet-resistant glazing is/are preferably likewise of toughened glass. This measure ensures that the entirety of the bullet-resistant glazing is structurally self-supporting along with having excellent residual load capacity in the event of damage.

Generally to be understood by the term "toughened glass" as used herein is glass having a flexural strength of at least 70 $N/mm^2$. Toughened glass can for example be thermally toughened glass. In thermal toughening, the glass is heated homogeneously; i.e. uniformly across the cross section, to a temperature of approximately 100° C. above the transformation point (approx. 620° C. to 670° C.). The glass pane is then rapidly cooled from the surfaces and put into a state of residual stress.

The cooling normally ensues by blowing air on it. At the beginning of the cooling process, the stress is constant over the entire cross section. Then the cooling of the surface begins, which contracts in the process. This is impeded by the core which has not yet cooled down. This results in short-term tensile stress on the surface and compressive stress in the core. However, the stresses only reach low values at this point in time since they are quickly reduced again by the high viscosity of the hot glass material.

In the final cooling phase, the glass has roughly the properties of an elastic body. The temperature distribution is parabolic and the core is warmer than the surface. In order to reach the final state, the core therefore needs to cool down more than the surface. The core thus generates compressive stresses on the surface in the already "solid" glass. Tensile stresses develop in the core itself due to the equilibrium of forces. The viscoelastic material behavior of the glass is thus critical to the development of permanent stresses (=residual stresses). This should be illustrated by a comparison of material behavior on the surfaces of an elastic body when cooling down to that of a viscoelastic body.

Float glass in particular preferably serves as the base product for thermal toughening.

Toughened glass panes are either fully tempered glass panes or heat-strengthened glass panes (TVG).

Apart from thermal toughening, chemical toughening is also possible. Here, an initial stress is achieved through ion exchange processes on the surface. The prestressing can thereby reach very high values and thus makes chemically toughened glass interesting for use in bullet-resistant glazings. In particular, values on the order of 150 N/mm$^2$ can be achieved with regard to the flexural strength of chemically toughened glass.

To increase the residual load capacity of the bullet-resistant glazing, and particularly the ballistic block of the bullet-resistant glazing, an SGP film is in particular selected for the interlayer between the at least two transparent panes of the ballistic block. This is an ionoplast film consisting of semi-crystalline thermoplasts. Compared for example to PVB films, an SGP film interlayer has high rigidity at room temperature. The time and temperature-dependent shear modes of the SGP interlayer differ significantly from those of PVB. SGP has been shown to be clearly more shear-resistant and flexurally rigid in the temperature ranges relevant to construction. This can be attributed to the increased glass transition temperature of approximately 55° C. compared to PVB. In most practical construction applications, the structural element temperature is lower than this glass transition temperature.

The inventive glazing with heat-strengthened glass is EN 1063 certified in all relevant bullet-resistance classes up to BR7-NS. This represents a distinctive feature which can only result from the specific glazing structure combination. All previously known bullet-proof glass has been manufactured and certified in non-toughened float glass (window glass). While float glass has ballistics-related advantages, it also has major disadvantages in terms of a resilient, statically verifiable load-bearing structure as can be realized with the bullet-resistant glazing according to the invention.

Also a further crucial difference from existing bullet-resistant glazings is passing the bullet-proof classification for curved glass according to DIN EN 1063. This can be achieved due to the inventive glazing being composed of toughened glass panes.

Thus, the invention particularly also relates to a glazing, wherein the at least two transparent panes of the ballistic block and/or the at least one further transparent pane are in the form of a curved pane of glass having a predetermined or determinable bending radius. The curved glass is industrially manufactured by bending machines (so-called bending tempering furnaces). In particular, the glass panes are not individually formed in the so-called gravity bending process since this would firstly be relatively costly and particularly because it contravenes the very idea of the invention itself since the invention intentionally only utilizes toughened glass.

For fire safety reasons, the SGP film, which is used as interlayer between the at least two transparent panes of the ballistic block, preferably has an overall maximum nominal thickness of 0.9 mm.

According to embodiments of the bullet-resistant glazing, it is further provided for the interlayer between the at least two transparent panes of the ballistic block to be formed from a material of high strength compared to polycarbonate. Of course, however, this aspect is not to be regarded as limiting.

Particularly provided with the bullet-resistant glazing is for the interlayer, by means of which the at least two transparent panes of the ballistic block are joined together, to comprise a transparent and in particular polycarbonate-free and/or polymethylmethacrylate-free interlayer which, compared to a polycarbonate material, connects the panes together at high strength.

The advantages able to be achieved with the inventive solution are obvious. Because the bullet-resistant glazing comprises a ballistic block as well as at least one further transparent pane arranged at a spacing from the ballistic block, a bullet-proof double-pane glazing results which, due to the air gap between the ballistic block on one side and the at least one further transparent pane on the other, provides good thermal insulation.

On the other hand, the selected multi-layer glazing proves very effective in terms of its bullet-proof or respectively bullet-resistant property. The ballistic block arranged on the impact side thereby essentially prevents projectile penetration while the at least one further pane at a spaced arrangement from the ballistic block on the far side from the impact side has the task of intercepting any splinters that may be detach off the back of the ballistic block when fired upon.

Because the ballistic block of the inventive glazing comprises a plurality of transparent panes joined together by means of an interlayer, whereby the ballistic block itself assumes the function of energy absorption, it is in particular possible to dispense with any energy-absorbing films or panels on a surface of the ballistic block panes opposite from particularly a potential direction of fire.

Moreover, this approach enables joining the panes of the ballistic block by way of an interlayer such that the ballistic block at the same time forms a resilient, load-bearing structure, particularly also in sizes larger than 15 m$^2$. The interlayer is in particular transparent and most notably formed from a polycarbonate-free and/or polymethylmethacrylate-free material.

This measure does away with the limited manufacturing size of conventional anti-shatter films known from the prior art. In this respect, bullet-resistant glazing sizes in the range of e.g. 20 m×3.5 m (or larger) are in particular also conceivable. In particular, a non-shattering, bullet-resistant effect can as a whole be achieved without the bullet-resistant glazing and in particular the ballistic block of the bullet-resistant glazing comprising an energy-absorbing layer or polycarbonate film.

Particularly preferential in this context is for the interlayer(s) of the ballistic block to be at least partly or partially formed from an ionoplast polymer or a material having similar material properties such as high-strength polyvinyl butyral (PVB), for example.

In this context, a two-component and in particular crystal-clear silicone is also particularly suitable as the material for the intermediate layer(s) of the ballistic block. Such a two-component silicone material is particularly also of advantage with respect to reaction to fire since it is difficult or impossible to ignite. According to embodiments of this aspect, a reactive and preferably crystal-clear silicone material which fully cures above a predeterminable critical temperature is in particular employed. In the cooled state; i.e. a state below the critical curing temperature, such a silicone material can then be infused or otherwise introduced into a gap between two panes of the ballistic block.

Compared to conventional PVB films or PVB sheets, or conventional polycarbonate panels respectively, which are applied to an outer surface of the panes as an energy-absorbing structure, interlayers of high-strength polyvinyl butyral or of a two-component silicone material or an ionoplast interlayer are substantially tougher and more rigid such that the ballistic block does not become unstable even at greater weight (i.e. with larger dimensions) and instead remains structurally self-supporting as a whole.

It has additionally been shown that depending on the temperature, cracks can form in the layer of a bullet-resistant laminated glass which uses a polycarbonate film as a ductile energy-absorbing plastic external layer due to the properties of the polycarbonate layer, which has a negative effect on the overall appearance and the safety of the laminated safety glass.

By the invention making use of an interlayer in the ballistic block of the inventive glazing formed for example from ionoplast instead of a polycarbonate outer panel, no cracks will develop in the ionoplast interlayer, even given high temperature fluctuations in outdoor use on a long-term basis, since it is designed to be significantly more rigid and stronger than polycarbonate.

Particularly due to the use of a polycarbonate-free ballistic block, and in particular the use of an ionoplast interlayer as an energy-absorbing plastic interlayer, glazing dimensions of at least 15 $m^2$ and preferably at least 20 $m^2$ can be realized. On the one hand, this is due in particular to the high-strength interlayer being able to reduce the amount of plastic material per unit area, having a positive effect on the glazing's reaction to fire and, on the other hand, the ballistic block being structurally self-supporting even at a surface area of more than 15 $m^2$.

Bullet-resistant effect is rated according to five bullet resistance classes. In the currently highest bullet resistance class BR7, ballistic testing uses for example the G3 NATO rifle with 7.62×51 full metal jacket/hard core ammunition. This bullet resistance class thus sets the highest bullet resistance requirements.

According to embodiments of the present invention, the ballistic block exhibits a thickness-seen in the direction of fire-which resists ballistic fire from a 7.62×51 mm full metal jacket/hard core round pursuant to the DIN EN 1063, whereby the thickness of the ballistic block is in particular formed by an appropriate number of transparent panes each joined together by an interlayer and/or by an appropriate thickness to the transparent panes of the ballistic block.

In accordance with embodiments, so as to further optimize the thermal insulation of the bullet-resistant glazing, it can be provided for the hollow space between the ballistic block on the one side and the at least one further transparent pane on the other to be hermetically sealed and filled with a gas having a low heat transfer coefficient such as argon and/or krypton, for example.

In contrast to the composite ballistic block, it is not necessary to provide the at least one further transparent pane spaced from the ballistic block—provided laminated glass is again used here—with a high-strength interlayer. Rather, a laminated glass pane consisting of several individual panes joined to one another via a flexible, tear-resistant ionoplast film is preferably used as at least one further pane. An SGP film is for example used as the ionoplast film.

A space is provided between the ballistic block on the one side and the at least one further transparent pane on the other which collects any splinters that may occur when under fire. The space also serves to allow the glazing to flex to a limited extent. An 8 mm to 24 mm, preferably 12 mm to 16 mm spacing between the ballistic block and the at least one further pane has thereby proven advantageous.

A value between 13 mm and 60 mm for the thickness of the ballistic block and a value between 9 mm and 21 mm for the thickness of the at least one further pane have proven advantageous. This thereby reflects the role played by both the highest possible protection as well as the weight of the overall glazing.

In embodiments of the inventive double-pane glazing, same has an overall thickness of approximately 60 mm, wherein the ballistic block arranged on the impact side has a total thickness of 30 to 40 mm and a total interlayer thickness of 3 to 5 mm.

The air gap between the ballistic block on the one side and the at least one further transparent pane is preferably 12 to 16 mm, wherein the at least one further pane, in particular laminated glass pane on the far side from the impact side, has a thickness of 9 to 21 mm. This at least one further pane can consist for example of a thin silicate glass pane facing the air gap and a thermally toughened silicate glass pane facing outward.

This laminated glass pane is constructed in such a way that the outer thermally toughened glass pane of high flexural strength withstands the bending of a shattered front laminated glass pane formed as a ballistic block and the bending stresses imposed thereon by ejected splinters without breaking. Its surface is protected against damage from the resulting shards and/or from contact with the bulging front panes of the ballistic block by the thin normal glass pane facing the air gap so that the surface of this toughened glass pane remains intact and thus the full high flexural strength of the thermally toughened glass pane comes into effect.

According to a further aspect of the present invention, the thickness and/or material of the at least one interlayer of the ballistic block and/or at least one further transparent pane realized as laminated glass is selected such that the heat rating of the material is less than 55 MJ/kg and preferably less than 50 MJ/kg, and even more preferentially, less than 45 MJ/kg.

20) This enables improving the fire safety classification of the glazing. It is thereby advisable for the mass distribution of the interlayer of the ballistic block and/or the at least one further transparent pane realized as laminated glass to be between 0.02 $g/m^2$ and 0.10 $g/m^2$, preferably 0.05 $g/m^2$ and 0.08 $g/m^2$, and particularly 0.07 $g/m^2$.

The following will reference the accompanying drawings in describing exemplary embodiments of the inventive bullet-resistant glazing in greater detail.

Figure 2:
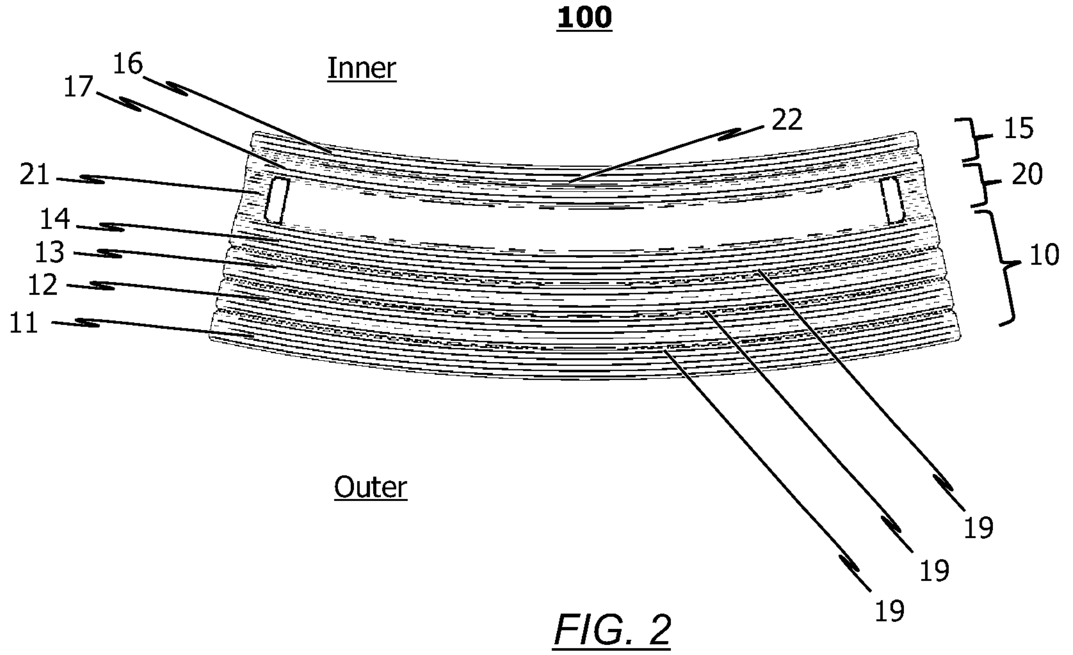
Figure 3:
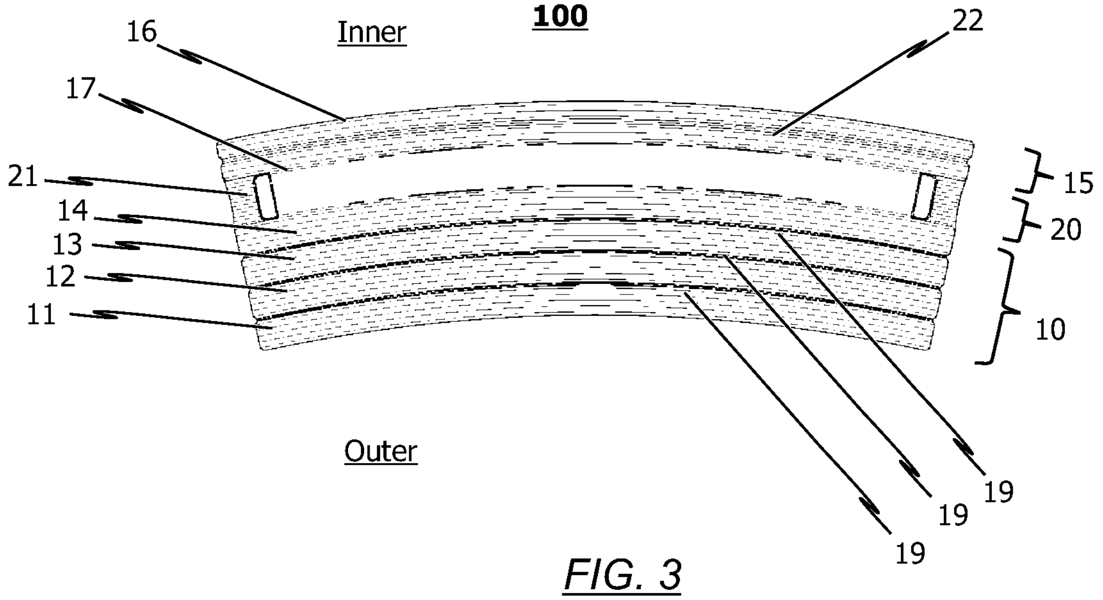
Figure 4:
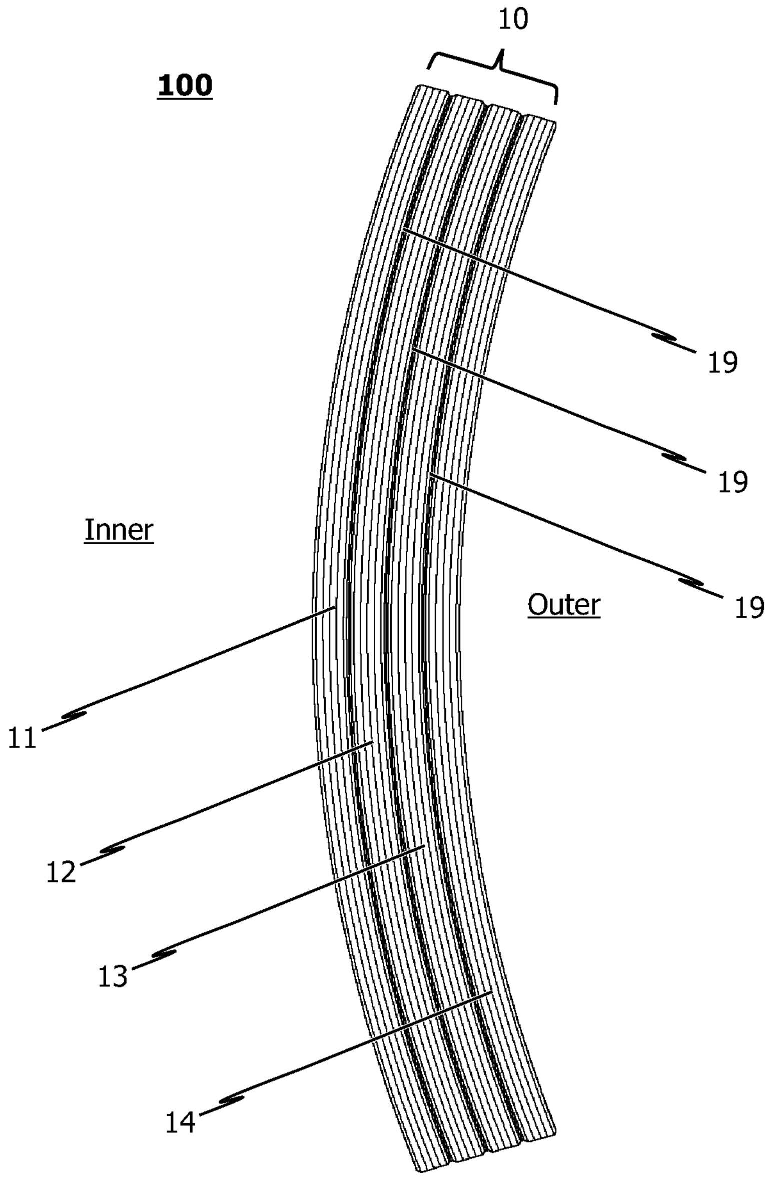

Shown are:

FIG. 1 a schematic and cross-sectional view of a section of an edge region of one exemplary embodiment of the inventive glazing;

FIG. 2 a schematic and cross-sectional view of a further embodiment of the inventive bullet-proof glazing;

FIG. 3 a schematic and cross-sectional view of a further embodiment of the inventive bullet-proof glazing;

FIG. 4 a schematic and cross-sectional view of a further embodiment of the inventive bullet-proof glazing.

According to the current prior art, a non-shattering bullet-proof glazing 100 in the BR1-NS to BR7-NS classes pursuant to the EN 1063 standard is primarily based on the approach of using resilient layers applied to the inner side of the glazing 100 to retain outward spall. These applied layers usually consist of either polycarbonate or a clear, tear-resistant, anti-shatter film.

These layers always on the innermost side due to their function have the disadvantage of not having scratch resistance comparable to glass surfaces. For this reason, moving the splinter shield to the space between the panes does not currently allow for the application of suitable solar screening coatings, which is very often necessary for the correspondingly required structural engineering qualities of the glazing 100.

In addition, the currently available anti-shatter films or polycarbonate panels are limited in their production size. As of a certain size of insulating glass or relevant structural requirements, the use of TPU composite films as required for laminating polycarbonate to glass is no longer sufficient for the load transfer. The fire safety classification of this glazing 100 is moreover very unfavorable due to the large combustible mass of polycarbonate.

These and other disadvantages are eliminated by the glazing 100 according to the invention, which in particular provides for containing the glass shards and projectile spall from the exterior non-classified armored glass pane which occur when under ballistic fire in the space between the panes of the bullet-resistant glazing 100 formed as a ballistic block. The space between the panes is thereby used as a buffer for the pressure wave and the splinters. Thus, in the end, the necessary classification is achieved by the glazing 100 designed as an insulating glass unit as a whole.

In detail, the embodiment of the inventive glazing 100 depicted schematically in FIG. 1 is realized with an exterior armored glass pane as a ballistic block 10. To that end, the ballistic block 10 has at least two and—as indicated in FIG. 1—e.g. four transparent panes 11, 12, 13, 14, each joined to one another by an interlayer 19.

A laminated glass pane 15 having a total of two (additional) transparent panes 15, 16 is provided parallel to the panes 11, 12, 13, 14 of the ballistic block 10 and spaced therefrom by a peripheral spacer 21, the spacer 21 connecting same to the ballistic block 10 such that a hollow space 20 is formed between the ballistic block 10 on the one side and the laminated glass pane 15 on the other.

Accordingly, the bullet-resistant glazing 100 consists of the ballistic block 10 facing the impact side, which as a whole is realized as a laminated glass pane, and the at least one further transparent pane 15, 16 on the far side from the impact side, which is likewise realized here as a laminated glass pane 15.

This at least one further transparent pane 15, 16, realized as a laminated glass pane 15 is combined with the ballistic block 10 and the interposed air gap 20 into a double-pane insulating glazing, and done so by the ballistic block 10 and the at least one further transparent pane 15, 16 being connected to the spacing frame or spacer 21 respectively via adhesive layers. The fillet formed by the edge regions of the ballistic block 10 and the at least one further transparent pane 15, 16 as well as the spacer 21/spacing frame is realized with a sealing compound.

In the exemplary embodiment shown in FIG. 1, the ballistic block 10 realized as a laminated glass pane comprises a total of four glass panes 11, 12, 13, 14, each being e.g. a silicate glass pane, which are joined to one another via interlayers 19 made of an ionoplast polymer.

The glazing according to the invention is in particular characterized by the panes 11, 12, 13, 14 of the ballistic block 10 being panes of toughened glass. The further transparent panes 16, 17 are preferably also panes of toughened glass. The transparent panes 11, 12, 13, 14 of the ballistic block 10 and the further transparent panes 16, 17 are thereby combined into one structurally self-supporting unit such that the glazing 100 only needs to be held on two sides when installed.

The glass panes 11, 12, 13, 14 of the ballistic block 10 realized as a laminated glass pane can each have the same thickness; although it would also be conceivable for the outer glass panes 11, 14 of the ballistic block 10 realized as a laminated glass pane to be significantly thinner than the middle glass panes 12, 13. In these embodiments, the glass panes 11, 12, 13, 14 of the ballistic block 10 realized as a laminated glass pane have a thickness of, for example, approximately 8 to 15 mm.

The air gap 20 between the ballistic block 10 and the at least one further laminated glass pane 15 is preferably at least approximately 12 mm.

The at least one further laminated glass pane 15 comprises the glass pane facing the air gap 20, which can be realized for example as a silicate glass pane having a thickness of e.g. approximately 3 mm. This glass pane 17 facing the air gap is bonded to an exterior glass pane 16 of thermally toughened silicate glass via an interlayer 22, in particular a polyvinyl butyral interlayer having a thickness of e.g. 1.5 mm. This exterior glass pane 16 of the at least one further laminated glass pane 15 can exhibit the same thickness as the interior glass pane 16.

However, selecting a greater thickness for the exterior glass pane 16 is also conceivable, for example a thickness of 6 mm, so as to be able to achieve a flexural strength of at least 500 kg/cm 2.

The inventive glazing 100 has a bullet-resistant effect corresponding to the BR37-NS ballistic resistance class, whereby no splintering occurs on the far side from the ballistic fire.

No rating-classified, bullet-proof exterior pane is required to produce the bullet-resistant glazing 100, which significantly reduces the overall glass thickness structure and thus the weight and the costs of the glazing 100 as a whole.

This new application further does away with the previous size limitation, for example due to the availability of polycarbonate panels for bullet-proof glass. Theoretically, sizes of, for example, at least 20 m×3.5 m are now also thereby possible.

Moreover, the glass surfaces can be cleaned in the completely normal way one cleans all glass surfaces. In particular, there is no need to be concerned about scratching the polycarbonate or the anti-shatter films.

Furthermore, solar screening and thermal insulation coatings can be applied to any surface in the space 20 between the panes of the glazing 100 without any difficulty.

By using high-strength, permanent load-transferring composite films such as, for example, ionoplasts in the exterior ballistic block, such glass can additionally be subjected to higher static loads. The main advantage in this is that the ballistic block at the same time constitutes the structurally resilient exterior pane of the insulating glass structure. This is most relevant when utilized for correspondingly high loads (e.g. hurricane loads) or simply ultralarge insulating glass. The only task remaining for the interior laminated pane is thus creating an insulated space between the panes and trapping the splinters.

None of this is possible if polycarbonate panels or anti-shatter films are used to protect against splintering. This is because when laminating with corresponding composite films such as TPU film (thermoplastic polyurethane), high-strength films cannot be combined in the same package simultaneously. Such high-strength films, e.g. ionoplast films, require their own program cycles with, for example, higher temperatures; the TPU film would thereby overheat and become unusable.

Ultimately, there is no degrading of the fire safety classification through the use of standard laminated safety glass composite units.

FIG. 2 and FIG. 3 each show further embodiments of the inventive bullet-resistant glazing 100 schematically and in cross-sectional view. In FIG. 2, the inventive glazing 100 is realized with an exterior armored glass pane as ballistic block 10, whereby the ballistic block 10 here comprises a total of four transparent panes 11, 12, 13 and 14 which are each joined together via an interlayer 19.

Provided parallel to the panes 11, 12, 13 and 14 of the ballistic block 10 and spaced therefrom via a peripheral spacer 15 is a laminated glass pane 15 with a total of two (additional) transparent panes 15, 16 connected to the ballistic block 10 by means of the spacer 21 such that that a hollow space 20 is formed between the ballistic block 10 on the one side and the laminated glass pane 15 on the other.

It is in particular provided for the glazing 100 depicted schematically in FIG. 2 to have an outward convex curve.

In contrast, in the embodiment depicted schematically in FIG. 3, it is provided for the glazing 100 shown there to be of concave design relative to the exterior. Apart from that, the embodiment of the inventive glazing 100 shown in FIG. 3 corresponds to the embodiment shown in FIG. 2.

The special structure of the glazing enables realizing the curved design of the glazing.

FIG. 4 shows an embodiment of the ballistic block (10) that forms the bullet-resistant glazing (100) without a further transparent pane and in particular without a further transparent pane arranged at a spacing from the ballistic block (10).

What is claimed is:

1. A ballistic block for a bullet-resistant glazing, wherein the ballistic block comprises at least two transparent panes joined to one another by an interlayer, wherein the interlayer is composed of at least partly or partially from an ionoplast polymer, a first side defined by one of the at least two transparent panes, a second side opposite the first side, wherein the second side is defined by another one of the at least two transparent panes, wherein the ballistic block does not include a further energy-absorbing layer on the first side, wherein ballistic block does not include any polycarbonate, and wherein the at least two transparent panes are each made of heat-strengthened glass having a flexural strength of 70 N/mm$^2$ to 120 N/mm$^2$, wherein the ballistic block does not include a hollow space between any of the at least two transparent panes from the first side to the second side, and wherein the at least two transparent panes are combined by the interlayer into one structurally self-supporting unit such that when the ballistic block is installed, the ballistic block is retained on no more than two sides of the ballistic block.

2. The ballistic block according to claim 1, wherein the interlayer is an SGP film, and wherein the interlayer has an overall maximum nominal thickness of 0.9 mm.

3. The ballistic block according to claim 1, wherein the ballistic block has a symmetrical and monolithic construction.

4. The ballistic block according to claim 1, wherein the ballistic block includes a thickness measured from the first side to the second side, and wherein the thickness is configured to resist the ballistic fire from a 7.62×51 mm full metal jacket/hard core round pursuant to the standards under DIN 1063.

5. The ballistic block according to claim 1, wherein the ballistic block is curved.

6. The ballistic block according to claim 1, wherein each of the first side and the second side of the ballistic block is configured to act as an outermost attack side of the bullet-resistant glazing and resist ballistic fire pursuant to the standards under DIN 1063.

* * * * *